United States Patent
Fagrell

(10) Patent No.: US 9,226,346 B2
(45) Date of Patent: *Dec. 29, 2015

(54) MICROWAVE APPARATUS AND METHODS FOR PERFORMING CHEMICAL REACTIONS

(75) Inventor: Magnus Fagrell, Uppsala (SE)

(73) Assignee: Biotage AB, Uppsala (SE)

( * ) Notice: Subject to any disclaimer, the term of this patent is extended or adjusted under 35 U.S.C. 154(b) by 1946 days.

This patent is subject to a terminal disclaimer.

(21) Appl. No.: 12/216,294

(22) Filed: Jul. 2, 2008

(65) Prior Publication Data

US 2009/0020409 A1    Jan. 22, 2009

Related U.S. Application Data

(60) Division of application No. 10/775,072, filed on Feb. 11, 2004, now abandoned, which is a division of application No. 10/147,997, filed on May 20, 2002, now Pat. No. 6,720,540, which is a continuation of application No. 09/857,455, filed as application No. PCT/IB99/02021 on Dec. 17, 1999, now Pat. No. 6,403,939.

(51) Int. Cl.
*H05B 6/68* (2006.01)
*H05B 6/64* (2006.01)
(Continued)

(52) U.S. Cl.
CPC .............. *H05B 6/806* (2013.01); *B01J 19/0046* (2013.01); *B01J 19/12* (2013.01); *B01J 19/126* (2013.01);
(Continued)

(58) Field of Classification Search
CPC ..................... B01J 19/126; B01J 19/12; B01J 2219/00313; B01J 2219/00315; B01J 2219/00333; B01J 2219/00495; B01J 2219/00585; B01J 2219/0072; B01J 2219/01; H05B 6/68; H05B 6/806; H05B 6/705; Y02B 40/143
USPC ......... 219/709, 701, 702, 704, 679, 690, 695, 219/696, 687, 746, 748, 750; 422/21; 204/157.15, 157.43; 246/432; 34/259; 264/406

See application file for complete search history.

(56) References Cited

U.S. PATENT DOCUMENTS

| | | | |
|---|---|---|---|
| 3,281,648 A | 10/1966 | Collins | 363/158 |
| 4,314,128 A | 2/1982 | Chitre | 219/697 |

(Continued)

FOREIGN PATENT DOCUMENTS

| | | |
|---|---|---|
| DE | 197 00 499 A1 | 6/1998 |
| FR | 2 751 830 | 1/1998 |

(Continued)

OTHER PUBLICATIONS

English Abstract for JP9511355.

(Continued)

*Primary Examiner* — Quang Van
(74) *Attorney, Agent, or Firm* — Harness, Dickey & Pierce, P.L.C.

(57) ABSTRACT

The present invention relates to an apparatus and methods for performing chemical reactions. In particular, the present invention relates to an apparatus for heating chemical reaction mixtures. The apparatus applies one or more semiconductor based microwave generators making the apparatus suitable for parallel processing of chemical reaction mixtures. The invention further relates to methods for performing chemical reactions, e.g. methods for heating a plurality of samples simultaneously or sequentially, methods for monitoring a microwave heated chemical reaction, and methods where the optimum conditions with respect to parameters, such frequency and applied power can be determined for the system consisting of apparatus plus sample.

15 Claims, 6 Drawing Sheets

(51) Int. Cl.
*H05B 6/80* (2006.01)
*B01J 19/00* (2006.01)
*B01J 19/12* (2006.01)
*C40B 60/14* (2006.01)

(52) U.S. Cl.
CPC .......... *H05B 6/68* (2013.01); *B01J 2219/0072* (2013.01); *B01J 2219/00313* (2013.01); *B01J 2219/00315* (2013.01); *B01J 2219/00333* (2013.01); *B01J 2219/00495* (2013.01); *B01J 2219/00585* (2013.01); *B01J 2219/1209* (2013.01); *B01J 2219/1215* (2013.01); *B01J 2219/1218* (2013.01); *C40B 60/14* (2013.01); *Y02B 40/143* (2013.01)

(56) References Cited

U.S. PATENT DOCUMENTS

| | | | |
|---|---|---|---|
| 4,504,718 A | 3/1985 | Okatsuka et al. | 219/761 |
| 4,621,179 A | 11/1986 | Kusunoki et al. | 219/761 |
| 4,625,182 A | 11/1986 | Bovino et al. | 331/107 |
| 4,681,740 A | 7/1987 | Commarmot et al. | |
| 4,687,895 A | 8/1987 | Chitre et al. | 219/701 |
| 4,714,812 A | 12/1987 | Haagensen et al. | 219/697 |
| 4,771,153 A | 9/1988 | Fukushima et al. | 219/709 |
| 4,839,588 A | 6/1989 | Jantsch et al. | 324/158 |
| 4,870,236 A | 9/1989 | Berggren | 219/697 |
| 4,939,330 A | 7/1990 | Berggren et al. | 219/717 |
| 5,304,766 A | 4/1994 | Baudet et al. | |
| 5,393,492 A | 2/1995 | Di Martino et al. | |
| 5,511,238 A | 4/1996 | Bayraktaroglu | 455/81 |
| 5,521,360 A | 5/1996 | Johnson et al. | 219/709 |
| 5,558,800 A | 9/1996 | Page | 9/761 |
| 5,648,038 A * | 7/1997 | Fathi et al. | 264/406 |
| 5,672,889 A | 9/1997 | Brown | |
| 5,721,286 A | 2/1998 | Lauf et al. | 522/1 |
| 5,796,080 A | 8/1998 | Jennings et al. | 219/697 |
| 6,054,696 A | 4/2000 | Lewis et al. | 219/690 |
| 6,365,885 B1 * | 4/2002 | Roy et al. | 219/750 |
| 6,403,939 B1 * | 6/2002 | Fagrell | 219/709 |

FOREIGN PATENT DOCUMENTS

| | | | |
|---|---|---|---|
| JP | 05-190227 A | 7/1993 | |
| WO | WO 91/12888 | 9/1991 | |
| WO | WO 9112888 A1 | 9/1991 | B01L 7/02 |
| WO | WO 95/27367 | 10/1995 | |
| WO | WO 9527387 A1 | 10/1995 | H05B 6/68 |
| WO | WO 97/013136 | 4/1997 | |

OTHER PUBLICATIONS

English Abstract for JP5503466.

* cited by examiner

MICROWAVE APPARATUS AND METHODS FOR PERFORMING CHEMICAL REACTIONS

This application is a divisional Application of U.S. patent application Ser. No. 10/775,072 filed on Feb. 11, 2004 now abandoned, which is a divisional of U.S. patent application Ser. No. 10/147,997 filed May 20, 2002, now U.S. Pat. No. 6,720,540, which is a continuation of U.S. patent application Ser. No. 09/857,455, filed Jun. 27, 2001, now U.S. Pat. No. 6,403,939, which is National Stage Entry of PCT/IB99/02021 filed Dec. 17, 1999.

The present invention relates to an apparatus for heating chemical reaction mixtures. In particular, the present invention relates to an apparatus applying one or more semiconductor based microwave generators making the apparatus suitable for parallel processing of chemical reaction mixtures. The invention further relates to methods for performing chemical reactions, e.g. methods for heating a plurality of samples simultaneously or sequentially, methods for monitoring a microwave healed chemical reaction and methods where the optimum conditions with respect to frequency and applied power can be determined.

One of the major obstacles for an organic chemist today is the time consuming search for efficient routes in organic synthesis. As an example, the average performance some ten years ago in the pharmaceutical industry was around 25-50 complete substances per chemist per year resulting in an equal amount of new chemical entities as potential new drug candidates. Today the figure is several 100's per year and will soon be expected to be in the region of 1000's per year.

Thus, the challenges for the pharmaceutical industries and the organic chemist include identification of ways of reducing time in drug development, identification of ways of creating chemical diversity, development of new synthesis routes and maybe reintroduction of old "impossible" synthetic routes. Also, it is a constant challenge to reach classes of totally new chemical entities.

As it will be apparent from the following, microwaves assisted chemistry offers a way to circumvent at least some of the above-mentioned problems, namely speeding up the reaction time with several orders of magnitudes, improving the yield of chemical reactions, offering higher purity of the resulting product due to rapid heating and thereby avoiding impurities from side reactions, and performing reactions which are not possible with conventional thermal heating techniques.

Microwave assisted chemistry has been used for many years. However, the apparatuses and methods have to a great extent been based on conventional domestic microwave ovens. Domestic microwave ovens have a multimode cavity and the energy is applied at a fixed frequency at 915 MHz or 2450 MHz (depending on country). The use of single mode cavities have also been reported, see e.g. U.S. Pat. No. 5,393,492 and U.S. Pat. No. 4,681,740.

The market for microwave generators is totally dominated by magnetrons. In some situations travelling wave tubes (TWT) are used to amplify a microwave signal. There are several disadvantages related to the conventional apparatuses. Some of these will be listed in the following:

It is a disadvantage that the energy distribution in conventional microwave ovens is non-uniform. This leads to a varying temperature in the sample depending on the position of the sample in the oven. Furthermore, the non-uniform energy distribution makes it difficult to obtain reproducible results. This effect is especially noticeable if an array of sample holders such as a microtiter plate (e.g. with 96 wells) is used. Rotation of the sample in the oven does not significantly improve the reproducibility.

In conventional systems the power provided to each sample in an array of samples can only be calculate as an average power per sample by dividing the measured input power with the total number of samples. Due to the non-uniform energy distribution in the cavity this calculation will only provide a rough estimate of the applied power to each sample.

One way of controlling the reaction is to monitor pressure and temperature in all individual wells. This may give information of the conditions in a specified well during a particular run. Changing the position will give a different result leading to poor reproducibility. An alternative way of trying to obtain a uniform energy distribution is to place a large load in the cavity in order to absorb energy more uniformly.

Single mode cavity resonators offer a possibility of high efficiency and controlled heating patterns in small loads. However, the dielectric properties of the load often change considerably with temperature, resulting in very large variations in power absorption since an essentially constant frequency microwave generator is used. Hence, the process becomes difficult to predict.

A further disadvantage of conventional system relates to the fact that magnetrons usually only provide a fixed frequency or a minor adjustment around the centre frequency of the magnetron. Furthermore, magnetrons have an unpredictable behaviour and are extremely temperature sensitive, especially when the efficiency decreases, towards the end of its "life".

TWT's have been used as variable frequency amplifiers. However, TWT's are rather expensive and often very complicated to use. Furthermore, TWT's require warm-up time before start meaning that TWT's cannot rapidly be switched on and off. In addition, wear out of TWT's is associated with high maintenance costs.

Both magnetrons and TWT's require a high voltage power supply, which is a disadvantage in view of complications and the risk.

In U.S. Pat. No. 5,521,360 a variable frequency heating apparatus for providing microwaves into a furnace cavity is described. The apparatus comprises a voltage controlled microwave generator, a voltage controlled pre-amplifier and a power amplifier. The power amplifier may be a TWT. The TWT is operationally connected to the furnace cavity. The power delivered to the furnace is determined by measuring the power reflected from the furnace using a power meter. Upon placing a sample in the cavity furnace, power may be coupled to the sample causing the temperature of the sample to change.

The system described in U.S. Pat. No. 5,521,360 suffers from the above-mentioned disadvantages relating to e.g. TWT's.

It is a further disadvantage of the apparatus described in U.S. Pat. No. 5,521,360 that it is restricted to be used with only one cavity furnace, i.e. parallel heating of a plurality of samples using different heating parameters is not possible.

It is another object of the present invention to provide an apparatus comprising a first semiconductor based electromagnetic generator, and a first applicator for holding a sample, which apparatus are capable of performing a controlled heating of the sample.

It is another object of the present invention to provide an apparatus capable of performing parallel processing of many samples, with individually settings of process parameters such as frequency, power, temperature, pressure etc.

It is a further object of the present invention to provide an apparatus capable of monitoring many samples in parallel, with individually monitoring of process parameters such as frequency, power, temperature, pressure etc.

It is a still further object of the present invention to provide an apparatus capable of controlling many samples in parallel, with individually adjustments of process parameters such as frequency, power, temperature, pressure etc.

It is a still further object of the present invention to provide an apparatus in which samples can be evenly heated by using various applicators.

It is a still further object of the present invention to provide an apparatus in which the frequency of the applied energy can be varied.

It is another object of the present invention to provide an apparatus comprising a first semiconductor based electromagnetic generator, and a first applicator for holding a sample, which apparatus are capable of performing a controlled heating of the sample.

It is a still further object of the present invention to provide an apparatus in which it is possible to measure the temperature in the reaction vessel by monitoring the change in resonance frequency of a second material introduced into the reaction chamber. This material could be a crystal, semiconductor or any other solid state material with a temperature dependent resonance frequency.

The above-mentioned objects are complied with by providing in a first aspect an apparatus for providing electromagnetic radiation to a first applicator, said apparatus comprising:

a) a first generating means for generating electromagnetic radiation, b) a first amplifying means for amplifying the generated electromagnetic radiation, c) means for guiding the amplified electromagnetic radiation to the first applicator, and d) means for controlling the first generating means and the first amplifying means, wherein the generated electromagnetic radiation comprises a plurality of frequencies, and wherein the first generating means and the first amplifying means are essentially constituted by semiconductor components.

By essentially constituted by semiconductor components is meant that the components generating the electromagnetic radiation—such as the required power transistors—are semiconductor based power transistors.

In the present context, guiding means should be interpreted as any means capable of guiding electromagnetic radiation such as metallic channels or cables, such as coaxial cables or waveguides. The guiding means may also comprise active and/or passive components such as couplers, dividers, splitters, combiners, isolators, power meters, artificial loads, spectrum analysers etc.

In order to perform parallel processing of a plurality samples the apparatus may comprise a second applicator and suitable guiding means for guiding at least part of the amplified electromagnetic radiation to the second applicator. Generally it may be favourable to be able to provide electromagnetic radiation with different frequencies to the first and second applicator. Therefore, the apparatus may comprise a second generating means for generating electromagnetic radiation at a plurality of frequencies and a second amplifying means for amplifying the electromagnetic radiation generated by the second generating means. In order to provide electromagnetic radiation at a plurality of frequencies the second generating means and the second amplifying means are preferably constituted by semiconductor components, such as semiconductor based power transistors. Examples of such power transistors are silicon-carbide power transistors. It is evident that the same type of transistors may be used in first generating means and the first amplifying means.

To increase flexibility of the apparatus, the guiding means may comprise means for guiding the electromagnetic radiation amplified by the second amplifying means to the second applicator. In addition, the guiding means may further comprise means for guiding at least part of the electromagnetic radiation amplified by the second amplifying means to the first applicator.

Also, in order to further increase flexibility of the apparatus the guiding means may comprise means for switching the electromagnetic radiation amplified by the first amplifying means between the first and second applicator. Furthermore, the guiding means may comprise means for switching the electromagnetic radiation amplified by the second amplifying means between the first and second applicator.

The first and second applicators may be of various types. Preferable, the first and second applicators are selected from the group consisting of quasistatic, near field, surface field, single mode cavity and multi mode cavity applicators.

The frequency of the electromagnetic radiation generated by the first and second generating means may vary according to a first and second control signal, respectively. These first and second control signals may be provided by the control means. Similarly, the amplification of the first and second amplifying means may vary in accordance with a first and a second control signal, respectively. Also these signals may be provided by the control means. The control means may comprise a general purpose computer. Such a general purpose computer may form part of a neural network.

The frequency of the electromagnetic radiation generated by the first and second generating means is within the range 300 MHz-300 GHz, such as within the range 0.5-3 GHz or within the range 50-100 GHz.

In a second aspect, the present invention relates to a method for performing a plurality of chemical reactions simultaneously or sequentially, said method comprising the steps of:

a) providing a first sample into a first applicator, b) providing a second sample into a second applicator, and c) applying electromagnetic radiation to the first and second samples simultaneously or sequentially for a predetermined period of time, said electromagnetic radiation having a frequency in the range of 300 MHz-300 GHz.

The electromagnetic radiation may be provided specifically and independently to each of the samples. In addition, the applied electromagnetic radiation may comprise one or more pulses. The samples may be collected in sets comprising at least two holders. The sample itself may be a PCR mixture. During exposure of a sample the electromagnetic radiation may be applied in cycles of at least two steps where the sample is cooled at least during part of each cycle.

Preferably, the electromagnetic radiation is provided using an apparatus according to the first aspect of the present invention.

In a third aspect, the present invention relates to a method for performing a chemical reaction, said method comprising the steps of:

a) providing a sample in an applicator, b) applying electromagnetic radiation to the sample for a first predetermined period of time at a first level of power and varying the frequency of the electromagnetic radiation between two predetermined values and with a predetermined resolution, and determining a reflection factor of electromagnetic radiation from the sample at least some (two) of the frequencies covered by the range of the two predetermined values by determining the level of a feed-back signal, thereby obtaining a first set of reflection factors, c) changing the physical and/or chemical properties of the sample, d) applying electromagnetic radiation to the applicator at a second level of power and varying the frequency of the electromagnetic radiation between two predetermined values and with a predetermined resolution, the range defined by the predetermined values being included in the range defined by the predetermined values in step b), and determining a reflection factor of electromagnetic radiation from the sample at least some (two) of the frequencies covered by the range of the two predetermined values by determining the level of the feed-back signal, thereby obtaining a second set of reflection factors, and e) repeating step c) and d) until the difference in reflection factors calculated as the mathematical difference (subtraction) between the frequencies associated with the first and second set of reflection factors is within a predetermined range.

Step c) may comprise applying electromagnetic radiation for heating the sample. Alternatively or in addition, the sample may also be cooled and/or a reagent may be added to the sample. Also, if the difference in reflection factors is within the predetermined range after the first execution of step c) and d), step e) will off course no longer apply. Furthermore, if the difference is close to being within the predetermined range, it might not be economical to perform step e), and it may be omitted.

In a fourth aspect, the present invention relates to a method for performing a chemical reaction, said method comprising the steps of:

a) providing a sample in an applicator, b) applying electromagnetic radiation to the sample, the electromagnetic radiation having a starting frequency, c) varying the frequency of the applied electromagnetic radiation between two predetermined values and with a predetermined resolution, d) determining a reflection factor of electromagnetic radiation from the sample by determining a level of a feed-back signal during at least part of the varying of the frequency of the electromagnetic radiation, and e) determining, from the level of the feed-back signal, the frequency of the electromagnetic radiation where the reflection factor is within a predetermined range.

In a fifth aspect, the present invention relates to a method for performing a chemical reaction, said method comprising the steps of:

a) providing a sample in an applicator, b) applying electromagnetic radiation to the sample, the electromagnetic radiation having a starting frequency, c) varying the frequency of the electromagnetic radiation incrementally around the starting frequency, d) determining a reflection factor of electromagnetic radiation from the sample by determining a level of a feed-back signal at the starting frequency, at a frequency incrementally lower than the starting frequency and at a frequency incrementally higher than the starting frequency, e) repeating step b) to d) until the reflection factor is minimum.

In a sixth aspect, the present invention relates to a method for performing a chemical reaction, said method comprising the steps of:

a) providing a sample in an applicator, b) applying electromagnetic radiation to the sample, the electromagnetic radiation having a starting frequency, c) varying the frequency of the electromagnetic radiation incrementally around the starting frequency, d) determining a reflection factor of electromagnetic radiation from the sample by determining a level of a feed-back signal at the starting frequency, at a frequency incrementally lower than the starting frequency and a frequency incrementally higher than the starting frequency, e) comparing the determined reflection factor with a predetermined reflection factor, f) adjusting the starting frequency to a frequency so that the determined reflection factor is within a predetermined range around the predetermined reflection factor, and g) repeating step c) to f) as often as desirable.

The starting frequency may be in the range of 300 MHz-300 GHz. The predetermined values between which the frequency of the electromagnetic radiation may be varied are in the range of 300 MHz-300 GHz, such as within the range 0.5-3 GHz or within the range 50-100 GHz. Preferably, the reactions according the third, fourth, fifth and sixth are performed using an apparatus according to first aspect of the present invention.

In a seventh aspect, the present invention relates to a method for performing a chemical reaction, said method comprising the steps of:

a) providing a sample in an applicator, b) applying electromagnetic radiation to the sample in form of a first pulse with a predetermined shape and characterising a reflected pulse from the applicator by performing a mathematical operation so as to obtain a first reflected spectrum, c) changing the physical and/or chemical properties of the sample, d) applying electromagnetic radiation to the sample in form of a second pulse with a predetermined shape and characterising a reflected pulse from the applicator by performing a mathematical operation so as to obtain a second reflected spectrum, e) repeating step c) and d) until the difference between the first and second reflected spectra calculated as the mathematical difference (subtraction) between the first and second spectra is within a predetermined range.

If the difference in reflection factors is within the predetermined range after the first execution of step c) and d), step e) will off course no longer apply. Furthermore, if the difference is close to being within the predetermined range, it might not be economical to perform step e), and it may be omitted. Preferably, the mathematical operation for obtaining the first and second reflection spectra comprises Fourier Transformation but alternative operations may also be applicable. The method according to the seventh aspect of the present invention may be performed using an apparatus according the first aspect of the present invention.

In an eighth aspect, the present invention relates to the use of an apparatus according to the first aspect of the present invention for heating at least one sample comprising at least one organic compound. Each of the samples may further comprise one or more reagents and optionally a catalyst. Preferable, the apparatus according the first aspect of the present invention is configured to heat two or more reaction mixtures, such as PCR mixtures, simultaneously or sequentially or intermittently.

The frequency of the electromagnetic radiation, the level of irradiated power and the period of applying the electromagnetic radiation is determined by pre-set values for the chemical reaction in question, such pre-set values being stored in a storage means associated with the control means. Corresponding data of frequency and reflection factor may be stored in a memory for further processing. Further processing may be performed in a neural network.

In a ninth aspect, the present invention relates to a kit for chemically reacting chemical species with a reagent optionally under the action of a catalyst, wherein the chemical reaction is performed in an apparatus according to the first aspect of the present invention, said kit comprising:

a) a sample holder comprising at least one of the reagent and the optional catalyst, b) an electronic storage means comprising data concerning the chemical reaction between the chemical species and the reagent under the optional action of the catalyst, said electronic storage means and apparatus being adapted for retrieving the data from the storage means and processing said data so as to control the application of an electromagnetic radiation to said sample holder.

This aspect may further comprise instructions regarding addition of the chemical species to the sample holder.

As mentioned above, the present invention provides an apparatus and methods for performing chemical reactions, preferably chemical reactions performed in parallel. A particular interesting feature of the apparatus according to the invention is the use of semiconductor components in the signal generator and amplification means. As will be clear from the following, the semiconductor signal generator offers hitherto unrealised advantages in chemical synthesis and thus also in the methods according to the invention.

The main purpose of utilising microwaves or other electromagnetic radiation in an apparatus and methods for performing chemical reactions is to heat and/or catalyse reactions taking place in a sample exposed to microwave radiation. Preferably the sample is placed in a sample holder in the applicator of the apparatus.

Also, according to the apparatus and the method according to the present invention, the signal generator can be controlled in response to the actual level of signal energy supplied to—and/or absorbed in—the applicator. This feedback makes it feasible to control e.g. the temperature of the samples to a very high degree.

The term microwave is intended to mean electromagnetic radiation in the frequency range 300 MHz-300 GHz. Preferably, the apparatus and methods according to the invention are performed within the frequency range of 500 MHz-300 GHz, preferably within the frequency range 500 MHz-30 GHz such as 500 MHz-10 GHz such as 2-30 GHz such as 300 MHz-4 GHz such as 2-20 GHz such as 0.5-3 GHz or within the range 50-100 GHz.

Figure 1:
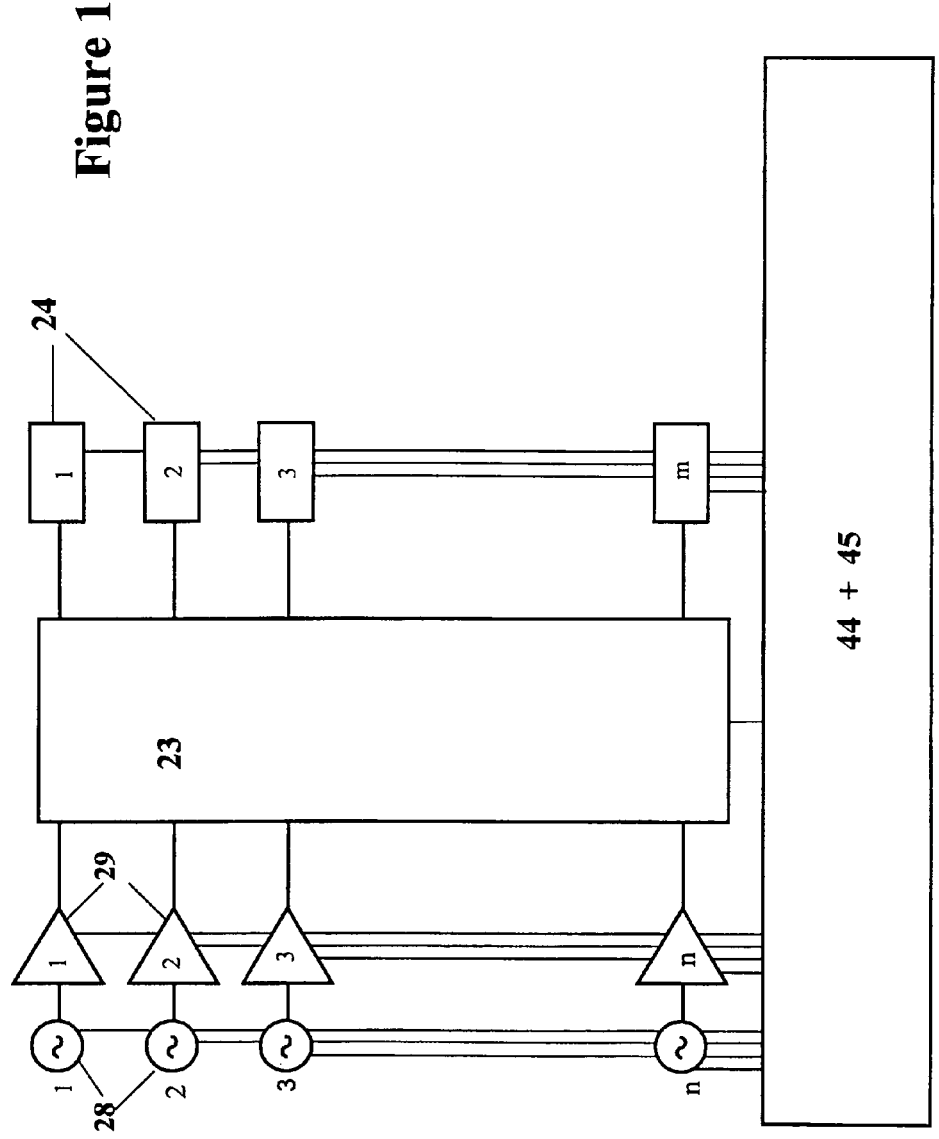
FIG. 1 illustrates possible combinations of the three main modules in an apparatus according to the invention.

FIG. 1 illustrates a preferred embodiment of an apparatus according to the present invention. The number n of signal generators 28 that are separately amplified by signal amplifiers 29 are connected to the number m of separate applicators 24 through the distributing network 23, represented by the box in the centre. It is seen that all components are connected to the power supply 44 and the controller 45. FIG. 1 illustrates parallel processing of samples, and that generators and applicators are preferably controlled in response to the coupling of microwave energy in the distributing network, the applicator or the sample. It should be mentioned that each applicator 24 can contain one or more samples.

If the average power to be delivered to each applicator 24 is less than the maximum output power of an amplifier 29, the number of applicators 24 can exceed the number of generators 28 and amplifiers 29, hence n<m. If the average power to be delivered to each applicator 24 is larger than the maximum output power of an amplifier 29, the power for each applicator can originate from several amplifiers. Hence the power output from some amplifiers can be distributed to several different applicators. In this case the number of applicators 24 can be less than the number of generators 28 and amplifiers 29, hence n>m. This guiding and coupling of radiation between amplifiers and applicators is performed by the distributing network 23. Each amplifier and applicator can also be coupled in pairs, that is n=m.

In the following, the individual components comprised in the apparatus will be described in more detail, including some preferred features.

The generating means 28 and the amplifying means 29 are essentially constituted by semi-conductor components in order to be able to generate a signal between 300 MHz and 300 GHz, several individual semiconductor based generators may be needed.

The power of the generated signal varies continuously between 0 and 1 W. The signal generator is capable of driving a signal amplifier and/or a power amplifier. Furthermore the signal generator is controllable/programmable from the controller 45. The control functions is in the form of controlling the amplitude, frequency, frequency bandwidth, signal form, pulse form or duration of the signal/pulse and any combinations of two or more functions at the same time.

Semiconductor based microwave generators and amplifiers provide a variety of advantages over conventional TWT's, gyrotrons and magnetrons. Examples of these advantages are:

Easy control of frequency and output power

Small physical dimensions

No high voltage required, which improves safety and reliability

No warm-up time, therefore immediately availability

Figure 2:
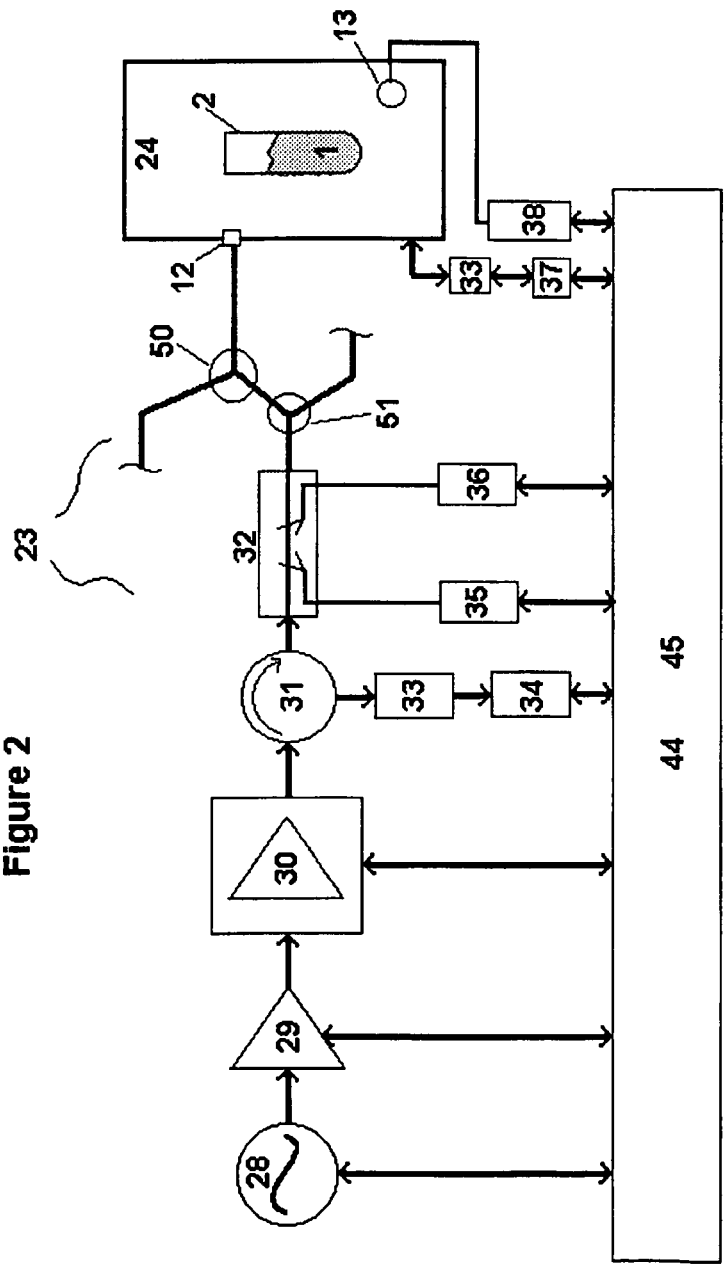
FIG. 2 illustrates an embodiment comprising of the apparatus according to the present invention.

No wear-out parts which significantly reduce cost maintenance and improve apparatus uptime Far higher MTBF and lower MTTR compared with TWT Better gain curve flatness compared with TWT Lower noise compared with TWT The amplifying means 29 can comprise a signal amplifier 29 and a power amplifier 30, as shown in FIG. 2. The signal amplifier 29 is a semiconductor-based device being adapted to amplify the signal from the signal generator. The gain of the amplifying means is adjustable by varying the level of a control signal. Thus the amplitude of the output can be selected by the operator.

The power amplifier 30 is provided for further amplifying the signal from the signal amplifier. The power amplifier is also a semiconductor-based device with an adjustable gain. The gain is varied by varying the level of a control signal.

The heating power applied to the applicator is preferably in the range of 1-2000 W depending on the sample size and the chemical reaction in question. Typical ranges are 1-300 W such as 5-50 W, 10-1000 W such as 30-100 W, and 50-2000 W such as 100-1000 W.

The necessary power of an electromagnetic radiation used for monitoring or "scanning" (see below) is typically only a fraction of the power needed for heating. Typical ranges are 0.05-100 W such as 0.1-10 W. The time of application also varies depending on the sample, process and the chemical reaction in question. Typical reaction times are 0.1 sec to 2 hours such as 0.2-500 sec or 0.5-100 sec.

The amplified signal from the amplifying means is distributed to one or more applicators using a distributing network.

The distributing network can comprise many features. FIG. 2 shows an embodiment of the apparatus comprising a selection of these features. FIG. 2 is only an example illustrating how the different features can be implemented, and the order of the features in FIG. 2 is not restrictive. The following features can be comprised in the distributing network:

circulators 31
bi-directional couplers 32
power meters 34-38
artificial loads 33
dividers 51
combiners 50
spectrum analysers Some of these features will be described in the following with reference to FIG. 2.

The circulator 31 prevents the reflected power from the microwave applicator 24 and the distribution network 23 from entering the power amplifier 30. Instead the reflected power is directed to a dummy load 33 optionally connected to a first power meter 34. Some semi-conductor baser generators and amplifiers, e.g. Silicon-carbide generators/amplifiers, are not affected by backscattered microwaves, and the circulator 31 is not necessary when such generators/amplifiers are utilised.

The circulator 31 is adapted to be operationally connected between the amplifying means and the distributing network, and has at least one input terminal, an output terminal and at least one combined input/output terminal. The input terminal is operationally connected to the output terminal of the amplifying means and the combined input/output terminal is operationally connected to the distribution network. Furthermore, the load 33 and first power meter 34 can be incorporated in the apparatus in connection with the circulator.

The distributing network can comprise a coupler, such as a bi-directional coupler 32, said coupler comprising an input terminal, at least two output terminals and a combined input/output terminal. The input terminal can be operationally connected to the output terminal of the circulator or amplifier and the output terminal is operationally connected to other parts of the distributing network.

The bi-directional coupler directs a fraction of the input and/or the reflected power to two power meters 35 and 36. The third power meter 36 measures a portion of the power transmitted in the direction towards the applicator(s), whereas the second power meter 35 measures a portion of the power transmitted in the opposite direction, i.e. away from the applicator(s). The power determining means can provide signals to the controller 45.

The distribution network can also comprise combiners 50 and dividers 51 in order to facilitate parallel processing. These can include switches so that the structure of the network can be varied.

In general, the distribution network is provided for distributing the electromagnetic radiation generated and amplified using the semiconductor signal generator and the semiconductor amplifiers respectively. The generated and amplified signal can be distributed to a single or to a plurality of applicators.

An example of such a network is coaxial cables with dividers in order to split up the power/signal line in as many power/signal lines as needed to feed all the separate applicators. Alternative ways of accomplishing a distributing network are to use waveguides, strip-lines etc. The distributing network can be an integral part of the applicator design as will be showed in FIGS. 3, 4, 5 and 6.

Applicators such as 24 can be of various types. According to the present invention some features are preferably comprised in the applicator. Some of these preferred features will be described in the following with reference to FIG. 2. A more detailed description of a number of embodied applicators will be given later.

The minimum requirements of an applicator are:
a) an input terminal 12,
b) a sample holder 1, and
c) means for confining the microwave energy from to the input terminal 12.

In order to control the operation of the signal generator and amplifier in response to the power absorbed in the sample (or reflected by the applicator), some measure of the total power absorbed in—and reflected by—the applicator has to be obtained.

In order to determine the absorbed amount of power (or energy) in the sample, the applicator can comprise means for determining the electromagnetic field strength. The applicator can comprise an output terminal operationally connected to a load 33 that absorbs the reflected power from the applicator. Furthermore, fourth power measuring means 37 are operationally connected to the load 33 and the control means 45. Also, a loop antenna 13 can act as microwave receiving means. The loop antenna is connected to a fifth power measuring means 38 and the control means 45.

The above mentioned load 33 and loop antenna 13 are used for monitoring and receiving the microwaves transmitted through the sample 1 by transferring the energy to power meters 37 or 38. The difference between the power irradiated at the sample and the power transmitted/reflected by the sample, measured with respective power meters depending on the exact setup, indicates the sum of the energy losses in the system and energy absorbed in the sample. The applicator can be calibrated by measuring the system losses of the unloaded applicator before the sample is introduced into the applicator. The energy absorbed in the sample will characterise the sample in terms of dielectric properties at a given temperature and frequency. By scanning the frequency within a given range, e.g. 1-4 GHz, and monitoring the signals from the load 33 or receiving antenna 13 together with the reflected signal from 35, it will be possible to follow the progress of a chemical reaction.

The applicator can also include sensors operationally connected to the controller in order to monitor and control the application of microwave energy to the sample or samples. Sensors for measuring any parameter characterising the extent of the process or reaction, such as pressure, temperature, pH, and conductivity, during the heating (and any intermediate non-heating phases thereof) can be comprised. One possible temperature sensor for microwave cavities is described in WO 94/24532. The output from such sensors can also provide a measure of the amount of power absorbed in the sample.

Spectrum analysers can be connected to the power measuring means, and the power measuring means can be frequency selective. If the electromagnetic signal directed to the applicator is time dependent, e.g. pulsed, analysis of the time and frequency spectra of a pulse irradiated at the sample, and the reflected/transmitted signal, can yield valuable information of the sample. This analysis can comprise Fourier transformation of the measured signals. This feature is not specifically connected to the applicator, rather it is a combination of measurements from power meters at different locations in the system, together with analysing means which can be comprised in the controller.

The applicator is preferably adjustable so that it can be tuned to support modes depending on the used frequency. It should be noted that the applicator can have a quasistatic, near field, surface field, single mode cavity or multi mode cavity, as well as an open ended cavity. The applicator can be tuned to make its resonance frequency correspond to the frequency of the signal connected to the input terminal 12, e.g. by adjusting certain geometrical parameters, such as a resonator rod, of it.

The sample 1 can be placed directly in the applicator, but the sample is typically placed in an open or closed sample holder 2. Such sample holder could be an integral part of the applicator or a separate reaction vessel of any material suitable for use in microwave heating applications. As will be known to the person skilled in the art, the material constituting the sample holder should preferably not absorb the microwave energy. Various types of polymers and glasses can be used. Specifically, various types of trays, microtiter plates, etc. can preferably be used when a plurality of samples is heated simultaneously. A plurality of sample holders can be assembled in a sample holder set, such set-up can generate a very even heating of all samples simultaneously.

The sample holder can furthermore be provided with sample inlet and outlet ports for sample transfer in and out of the applicator and the sample holder during or between the process steps or whole processes.

The free space in the applicator can be filled with an inert gas in order to avoid reaction between gasses and the sample. It is however preferred that the sample holder include a lid. It is preferred that the applicator includes at least one inlet/outlet for providing an inert atmosphere to the space above the sample. Alternatively, the space above the sample is filled with a reactive gas, e.g. $H_2$, which is useful in hydrogenation reactions.

The applicator should preferably be able to sustain high internal pressure either formed by the chemical reaction or formed intentionally to create a high-pressure atmosphere as a reaction parameter. High internal pressure is normally used as a method to increase the temperature of the sample over the boiling point for the liquid phase. The pressure can be kept at a predetermined level or pre-set as a level not to be exceeded or fall below. A pressure system incorporates a safety valve function for protection of the pressurised components and personal safety.

Rapid cooling of samples can be a very practical feature, which can be comprised in the applicator. Normally, when cooling samples without any use of means for cooling, the time for the sample to reach ambient temperature is usually quite long, leading to undesired side reactions and other unwanted phenomena. A forced cooling can therefore be used to minimise the time it takes for the sample to reach a predetermined temperature. The cooling device can be of any sort e.g. circulating air, circulating water or other liquid cooling media, peltier elements, etc. The cooling device can also be used to control the temperature during the process cycle. One important application of the cooling device is where temperature cycling of the sample is desirable. A pre-programmed temperature cycle is used to control the heating of the sample with microwaves and cooling of the sample by using the cooling device. An example of such an application is temperature cycling to perform the PCR reaction (Polymerase Chain Reaction).

The controller 45 has a central function as shown in FIG. 2. The controlling device is a computer based system for controlling (run-time control) and programming of the apparatus and all its modules/components.

The controller 45 might be connected to one or several PCs in a network as a user interface and/or computing device for one or several microwave apparatuses. In this way storage means for storing data and/or processed data and/or data concerning predetermined process parameters become available.

The control signal provided to the generating means 28 by the controller 45 varies according to a first function of the back-reflected or transmitted signal from the applicator 24, said back-reflected or transmitted signal being detected by one of the power measuring means 34-38.

The control signal provided to the amplifying means 29 and 30 by the controller varies according to a second function of the back-reflected or transmitted signal from the applicator, said back-reflected or transmitted signal being detected by one of the power measuring means 34-38.

The control signal provided to the generating means 28 determines the output frequency, the control signal provided to the amplification means 29 and 30 determines the amplitude of the amplified signal. The amplitude of the amplified signal can be varied as a function of time.

The control system has three different modes of operation:
1) heating mode
2) monitoring mode
3) programming mode Operating the controller 45 in heating mode puts specific requirements to the configuration of the controller. The controller is capable of setting and controlling the output power from the signal amplifier 29 and the power amplifier 30. Furthermore, the controller is capable of modulating the signal generated by the signal generator 28 so as to generate an output signal, which is a function of time such as a rectangular or triangular wave form. In the same context, the duty circle of the signal must be adjustable so as to reduce the power of the delivered signal.

The above-mentioned feature is provided by applying a first control signal to the signal amplifier 29 and a second control signal to the power amplifier 30.

Another feature, which has to be incorporated in the controller, is the ability to control the output frequency of the signal generator. Also the settings relating to frequency scans, i.e. start frequency, stop frequency, frequency resolution and scan time must be controllable from the controller. The starting frequency is in the range of 0.5-300 GHz, preferably in the range of 1-30 GHz. Predetermined values between which the frequency of the electromagnetic radiation is varied are in the range of 0.5-300 GHz, preferably in the range of 1-30 GHz. Furthermore, the process time for a complete process or parts of a process if it involves more than one step should be controllable.

Measuring the input power to the applicator by means of a power meter 36 is accomplished, however, the optimal position of power meter 36 depends on the exact configuration of the distributing network. Likewise, the reflected power from the applicator is measured with power meters 34 or 35 whereas 37 or 38 measures the power coupled out from the applicator. The power absorbed in the applicator can be measured by calibrating the apparatus with an empty cavity to measure the losses in the applicator. This calibration can be done within the frequency range where the sample is to be processed. By subtracting the reflected power and the loss power of an empty applicator the absorbed power can be calculated.

The power signal measured by the power meters 34 to 38 are transmitted to the controller so as to be used for controlling the frequency of the signal generator 28 and/or the gain in the signal amplifier 29 and/or the power amplifier 30.

The controller 45 can also provide control signals for system components—such as directional couplers 32, circulators 31, etc. The controller can provide other types of signal processing. The controller can control and monitor sample parameters such as temperature, pressure, pH, conductivity, etc, using the previously mentioned sensors. By current measuring of such parameters, the controller can respond if a parameter reach a predetermined values. It is possible to set a maximum value not to be exceeded during the process and a minimum value not to fall below during the process.

Determining the coupling between the electromagnetic radiation and the sample and varying the frequency and power of the radiation is essential. Furthermore, the frequency of the electromagnetic radiation can be changed in response to a change of the level of the feedback signal by more than a predetermined threshold value. Data concerning the frequency and the coupling efficiency—measured as a reflection factor—between the electromagnetic radiation and sample 1, can be stored in a memory for further processing.

In the monitoring mode, a scan function is available that normalises the signal from a first scan (gives a strait baseline), and detects the difference from the normalised baseline during a number of subsequent scanning cycles. Tracking and locking to the frequency that gives maximum power absorbed in the sample 1, (moving maxima) is another available feature. The frequency of the microwave generator 28 is adjustable to an extent of at least .+−0.30% around a centre frequency When the apparatus operates in programming mode the possibility of creating, storing, retrieving and editing using an in-built high level method programming language must be available for the operator. A method is a pre-programmed sequence of events where every event has at least one process as input. A process parameter is e.g. power, time pressure etc.

The apparatus can also comprise means of collecting and processing all process data and store and/or retrieve said data from an internal and/or external database.

By using an apparatus with said monitoring and controlling means combined with at least one of the following parameters to be variable: frequency, waveform, power, time, temperature, pressure, artificial atmosphere, it is possible to optimise and maintain these optimal conditions for said chemical reaction.

Referring again to FIG. 2, an apparatus for microwave assisted chemical and biological reactions is illustrated. One of the main features of the apparatus aims at optimising the reaction conditions for said chemical reaction. Another set of features of the apparatus aims at monitoring and controlling the optimised conditions for said chemical reaction. Yet another set of features aiming at process data collection, data processing, storing and retrieving data from an internal and/or an external database.

When two or more starting materials react chemically they are subject to changes in their physical and chemical properties. These changes in properties are usually temperature dependent. Chemical reactions are often performed at elevated temperature to enhance the speed of the reaction or supply enough energy to initiate and maintain a reaction. The form of the supplied energy could be thermal radiation, ultrasound, microwaves etc. In the case of microwaves as supplied form of energy the transferred energy into the reacting materials is dependent on the dielectric properties of the starting and formed materials during the chemical reaction. The dielectric properties are temperature dependent and will therefore vary during the chemical process. Changes in dielectric properties will also take place due to forming of new materials in the chemical reaction. The dielectric properties of materials are also known to change with the frequency.

In an apparatus with frequency tuning, an optimum of coupled energy into the reaction will occur at a specific frequency. This frequency will change according to the temperature in the reaction in accordance with the dependence of the samples' permittivity $\in'$ upon temperature.

The term "chemical reaction" is intended to mean any inorganic and organic reaction involving the formation or breaking of a (covalent) bond between two atoms, as well as conformer reactions of clusters and large molecules. It should be understood that the term also includes reactions where enzymes are involved as catalysts, e.g. the polymerase chain reaction (PCR) and similar types of reactions. The chemical reaction is preferably a reaction involving organic compounds, i.e. low molecular organic compounds and biological organic compounds (e.g. enzymes). It is furthermore preferred that a conversion of the chemical constitution of one or more organic compound takes place.

The chemical reactions are typically organic chemical reactions of which virtually all known reactions are applicable. Typical reactions types are polymerisation/oligomerisation, esterification, decarboxylatio, esterification, hydrogenation, dehydrogenation, addition such as 1,3-dipolar addition, oxidation, isomerisation, acylation, alkylation, amidation, arylation, Diels-Alder reactions such as maleinisation and fumarisation, epoxidation, formylation, hydrocarboxylation, hydroboration, halogenation, hydroxylation, hydrometallation, reduction, sulphonation, aminomethylation, ozonolysis, etc. It is believed that the apparatus and methods according to the invention are especially suited for reactions involving one or more catalysts and for asymmetric organic reactions.

The chemical reaction can take place in a suitable solvent or in neat form. When a solvent is used, it is preferred that the dissipation factor (or loss tangent) is greater than about 0.04 at room temperature. Examples of suitable solvents areacetonitrile, DMF, DMSO, NMP, water, tert-butanol, EtOH, benzonitrile, ethylene glycol, acetone, THF. The frequency of the generated electromagnetic signal can be tuned to absorption bands/peaks for the used solvent.

The chemical reactions typically involve a starting material (substrate or "chemical species"), a reagent and optionally a catalyst (e.g. an enzyme such as a thermostable DNA polymerase). The starting material can be any chemical substance in any phase, solid phase, liquid phase or gas phase. Included in starting materials are all materials used for e.g. solid support of reactants in chemical reactions. Starting materials also includes all materials (chemical substances) formed under the chemical reaction and can be considered as new starting material for a subsequent chemical reaction during the same process or in a new process performed in the same apparatus. Staring material or reagents can also be included in the gas phase of an artificial atmosphere. The finished chemical product from a previous chemical reaction, performed in the apparatus, shall also be considered as starting material for a subsequent chemical reaction performed in the apparatus.

The applicator 24 comprises a cavity or cavities for applying microwave energy to one or more samples 1. It should be understood that the various types of cavities and arrangements of cavities represent different embodiments of the applicator in the apparatus according to the present invention. As the apparatus in principle may involve an applicator of any known type (although with different degrees of success), the present invention is not limited to the specifically mentioned variants. In the following, different embodiments showing different applicator designs and degree of parallel processing is described. These embodiments may serve as applicator 24 in relation to FIGS. 1 and 2.

Figure 3:
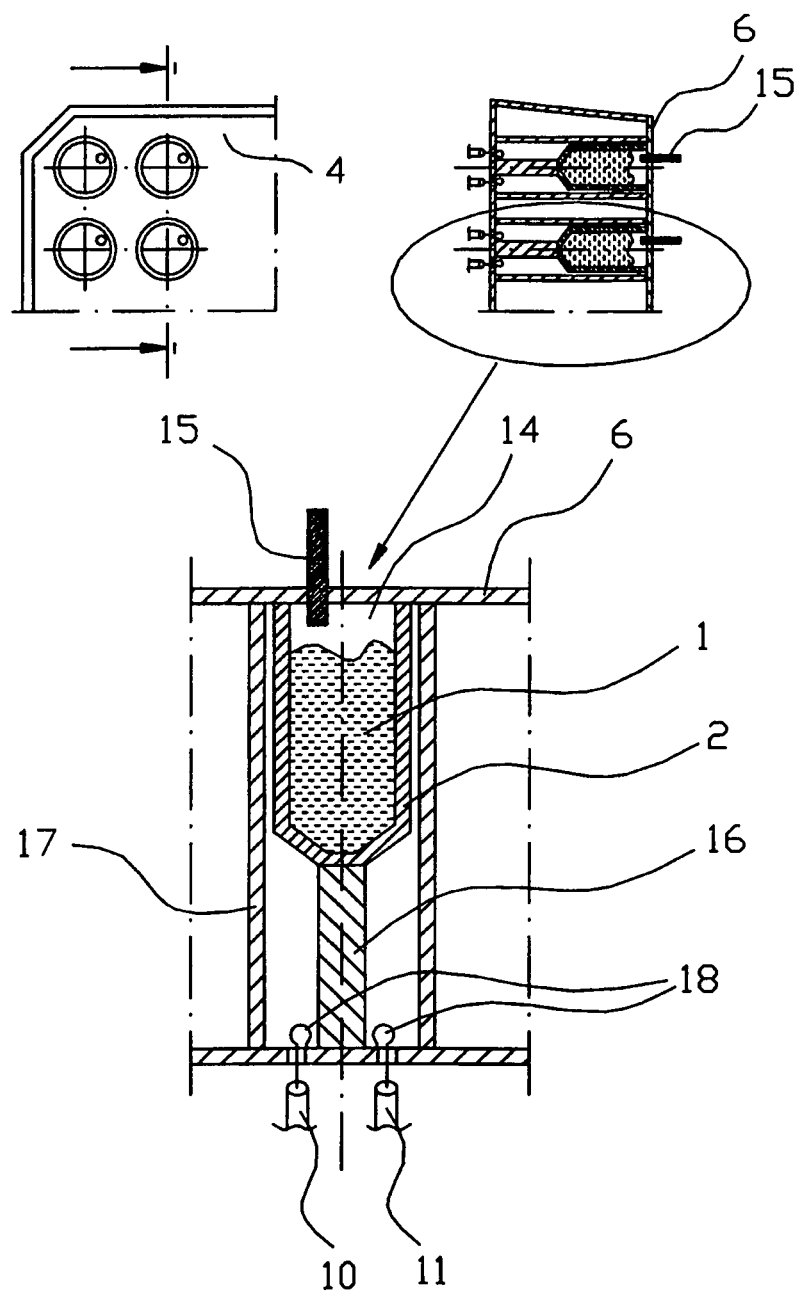
FIG. 3 illustrates an applicator mounted in a microtiter plate.

FIG. 3 illustrates a number of cavities mounted in an array. This array can be, but is not limited to, a microtiter plate 4. Each cavity is defined by a lid 6, a bottom plate 8 and an outer metal tube 17. Each cavity comprises a sample holder 2, a resonator rod 16 for adjusting the resonance frequency of the cavity, input and output signal loop antennas 18, and optionally a gas inlet/outlet 15. The microwaves are introduced inductively through loop antennas 18 as showed in FIG. 3, alternatively they can be introduced capacitative via a distributing network feeding the whole array. The sample is placed on the resonator rod 16 in the outer tube 17 of the cavity. The length of the resonator rod can be adjusted for changing the resonance frequency of the cavity. All components are electrical connected to each other to form a closed electrical circuit. The cavity could be pressurised and put under an artificial atmosphere.

Figure 4A:
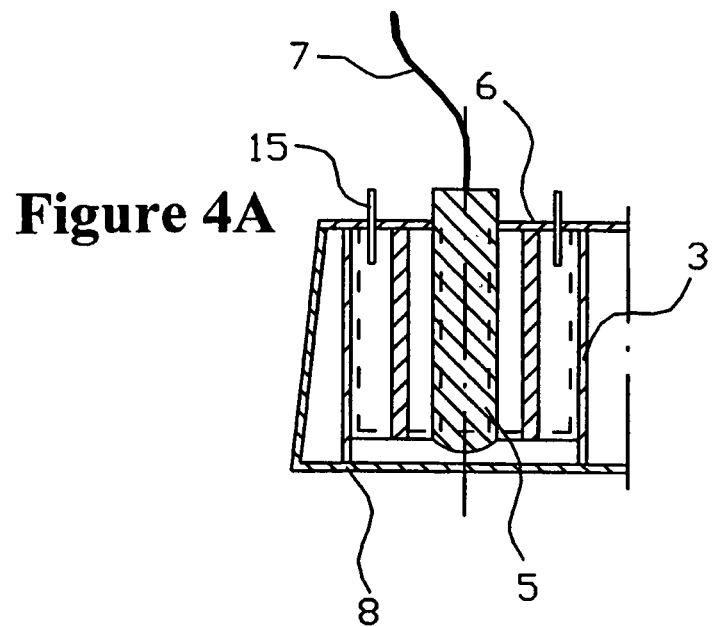
FIG. 4 illustrates a microtiter plate with a microwave conductor mounted symmetrical in the centre of four wells.
Figure 4B:
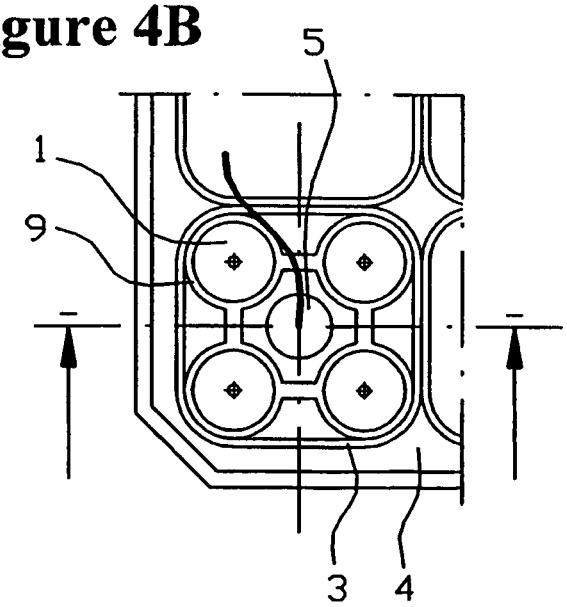

Another application is illustrated in FIGS. 4A and B where four sample wells 9 are assembled symmetrical in a sample holder set. A shielding metal cage 3 serving as walls in a cavity surrounds the four sample holders. The microwave transmitting device 5 is placed in the centre of the space defined between the four individual sample holders and thereby irradiates the four samples 1 simultaneously. Thus, in the embodiment illustrated in FIG. 4, a number (4 in the example) of samples are processed in parallel. As illustrated in FIG. 4B, a plurality of cavities can be arranged in an array similar to the array described in relation to FIG. 3.

Figure 5:
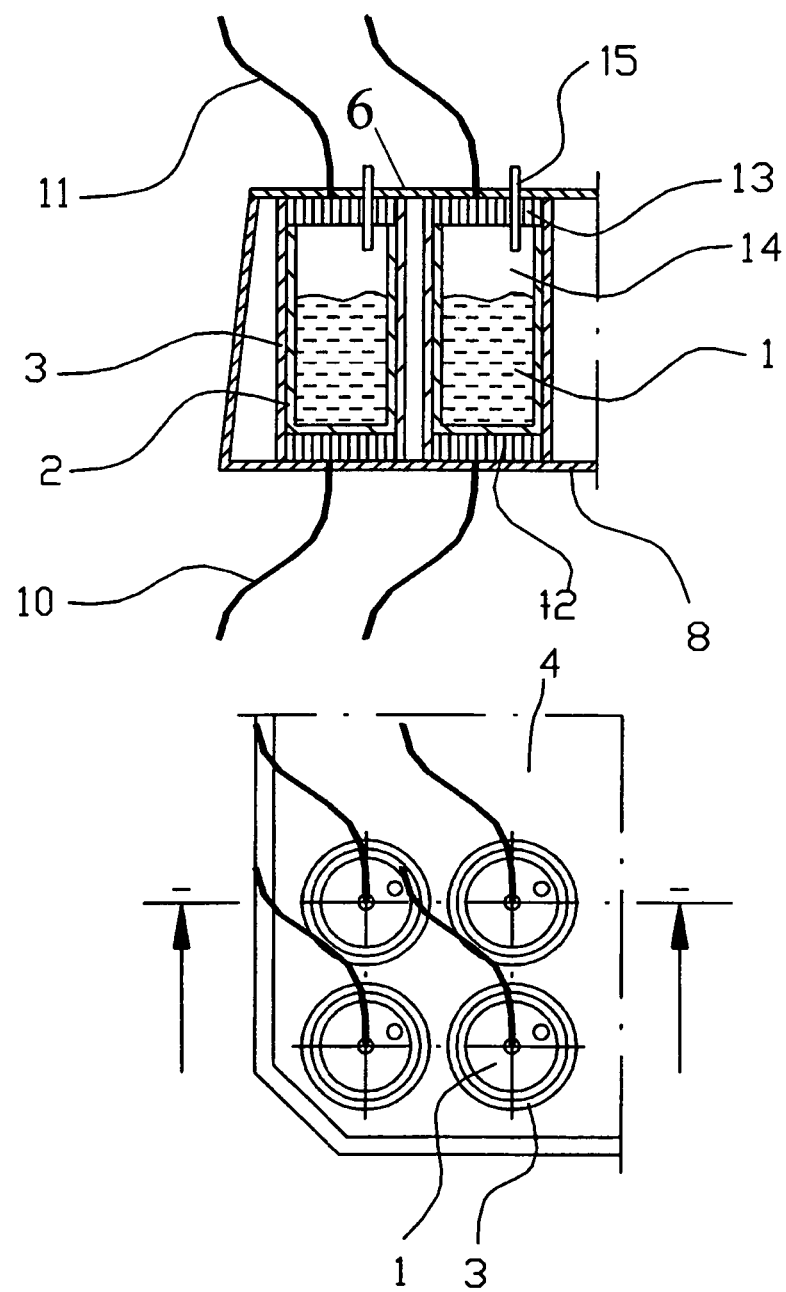
FIG. 5 illustrates a microtiter plate with transmitting type applicator with input and output parts 12 and 13.

FIG. 5 illustrates a configuration where the transmitting or receiving devices, 12 or 13 respectively, are mounted on the bottom-plate 8, and where these devices form an array. The lid 6 is mounted on top of the plate, and the receiving or transmitting device, 13 or 12, can be mounted on the lid. The bottom-plate or the lid can be, but is not limited to, a microtiter plate. The bottom-plate 8 and the lid 6 define a cavity with a metal tube 3. A vial made of a suitable material (glass or a polymer, e.g. polystyrene) is inserted into the metal tube to serve as a sample holder 2. A cooling device can be attached at the bottom-plate. In order to dissipate the microwave energy not absorbed, the lid can include a microwave absorbing material. The cooling device can also be attached to the lid in order to take care of the dissipated energy. An inlet/outlet port 15 for artificial atmosphere can be attached to the lid and/or the bottom-plate. The reaction vessel can be pressurised by using the artificial atmosphere or internally generated pressure from the chemical reaction. Field confinement can be achieved by using a high permittivity body at 12 or 13. Thereby the lid can be removed and the applicator becomes an open-end applicator.

Figure 6:
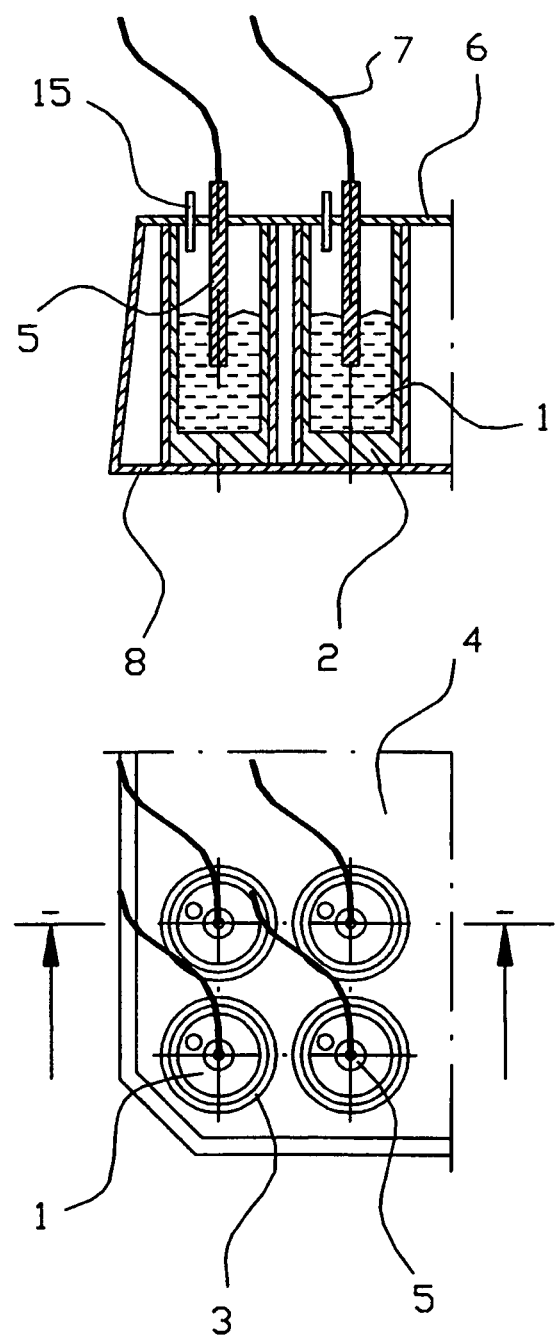
FIG. 6 illustrates a microtiter plate with an individual antenna for each sample well.

FIG. 6 illustrates a microtiter plate with an individual antenna 5 for each sample well, where the antenna is immersed in the sample well. Sample wells are arranged in an array and a metal tube 3 surrounds each well as a shield. A glass or plastic sample holder 2 is typically inserted into the metal tube 3 to serve as a sample holder. As in the case of the embodiments of FIGS. 3 and 5, each sample is processed individually.

General guidelines and instructions for the work with microwaves and the constructions of microwave cavities are, e.g., given in Gabriel, et al., Chem. Soc. Rev, 1998, Vol. 27, pp 213-223 and in Microwave Engineering, Harvey (ed.), Academic Press, London 1963 (in particular Chapters 4-6).

The apparatus according to the invention is suited for heating at least one reaction mixture (sample) comprising at least one organic compound. The reaction mixture or each of the reaction mixtures (samples) can further comprise one or more reagents and optionally a catalyst (e.g. an enzyme).

In a particularly interesting embodiment, the apparatus is adapted for heating two or more reaction mixtures simultaneously or sequentially or intermittently.

In one important embodiment of the present invention, a plurality of chemical reactions are performed in parallel. This is realistic due to the cost efficient construction of the apparatus according to the invention. FIG. 1 illustrates the principles behind the parallel processing of a plurality of samples.

The present invention also provides a method of performing a plurality of chemical reactions simultaneously or sequentially, according to the third aspect of the present invention described earlier.

This and the following methods are all suitable performed by using the apparatus defined herein.

The fact that the electromagnetic radiation can be adapted to each sample (e.g. with respect to frequency, heating time, power, pulsing of the signal, signal cycles, etc.) is important, e.g. in optimising processes and in the construction of libraries of chemical compounds. In the latter case, any differences in reactivity within the various reagents and various substrates (and enzymes) can be compensated for by the apparatus. Thus, in a further embodiment of the present invention, the apparatus is used for preparing a combinatorial library of compounds (at least 4 compounds). Also, the apparatus and the method according to the invention can be used to prepare a large number of compounds in a parallel process, where the compounds are not part of combinatorial library, i.e. where the compounds do not share common structural features. This is possible in a parallel process since the apparatus is capable of coupling the application of the electromagnetic radiation to each sample independently. A further interesting variant is the continuous preparation of compounds by using a sample holder having a sample inlet and a sample outlet. In this latter situation, a sample can be introduced in a sample holder formed as a loop or spiral of a tube, a rinsing solution is subsequently introduced through the sample inlet thereby forcing the sample out of the sample holder through the sample outlet, and a new sample is subsequently introduced. Due to the relatively short reaction time under microwave heating conditions, a large number of samples can be processed in parallel (several sample holders) or sequentially (one sample holder).

The process parameters, i.e. with respect to the frequency and the power of the electromagnetic radiation, are controlled by the controller (45). As should be understood from the above, the electromagnetic radiation is preferably provided by a semiconductor based signal generator, in particular by an apparatus as defined in the first aspect of the present invention. In certain applications, e.g. where a heating/cooling cycle is required, the electromagnetic radiation is preferably applied intermittently. Alternatively, any cooling means can be activated intermittently.

As mentioned above, the electromagnetic radiation is adapted specifically to each of the samples, i.e. for each sample/sample holder the process parameters are independently selected. This means that each of the samples are processed under different conditions, or that sets of samples are treated under substantially identical conditions but conditions different from other sets of samples, or that all samples are treated under substantially identical conditions. In the event that a set of samples is treated under substantially identical conditions, it can be advantageous to use an applicator essentially as illustrated in FIG. 4, where the sample holders are collected in sets consisting of two or more sample holders (a set of four sample holders is shown in FIG. 4). Such sample holder sets typically consist of 2-1000 sample holders, typically from 3-96 sample holders.

The apparatus will be able to generate data as an expression of the progress and completion of a chemical reaction. Such data can be stored in a database operationally associated with the controller. Furthermore the database might be provided with information regarding the product arising from the chemical reaction, e.g. purity, enantiomeric purity, yield, etc. In the event that a plurality of reaction mixtures are heated simultaneously in separate cavities under different conditions (e.g. conditions with respect to frequency, heating time, heating cycles, heating power, concentration of reagent, substrate and any catalyst, signal shape, reflected power, transmitted power, temperature, pressure, artificial atmosphere, type of sample vial, etc) or subsequently in the same or separate cavities under different conditions, such data will after proper analysis (e.g. automated statistical analysis) provide a unique possibility of optimising the reaction condition for subsequent similar chemical reactions. The processed data can be analysed with a suitable analysing method and evaluated to find optimal parameter settings and conditions. The result from the process can be processed by multi-variant data analysis for optimisation.

Furthermore it will be possible to provide a set of suitable reaction conditions for subsequent reactions of the same type, e.g. substitution reactions using a specific class of catalysts, Diels-Alder reactions using specific substrates, etc.

In a further prospect of the present invention, it is envisaged that such data for optimal (or suitable) process parameters for a number of standard type reactions can be identified by the supplier of the apparatus and be provided together with the apparatus according to the invention. Thus, in a preferred embodiment, the storage means associated with the controller includes a section designated for predetermined process parameters. Such a section could be formed as a replaceable memory card (or a "Smart Card") which can be updated regularly by the supplier of the apparatus and provided to the user of the apparatus.

Consequently, the present invention also relates to a method and the use as above wherein the frequency of the electromagnetic radiation supplied to the sample in the applicator, the level of transmitted power and the period of application of the electromagnetic radiation is determined by pre-set values for the chemical reaction in question, such pre-set values being stored in a storage means associated with the controller of the apparatus.

Thus, a further interesting aspect previously described as the ninth aspect, the present invention is a kit for chemically reacting a chemical species with a reagent optionally under the action of a catalyst, where the chemical reaction is performed in an apparatus as defined in the first aspect of the present invention.

In the ninth aspect, it should be understood that the sample holder provided with the kit can comprise one or more necessary reagents and/or any suitable catalyst so that the user only needs to provide the chemical species to the sample holder. The solvent (if a solvent is necessary or desirable) is preferably also provided with the kit so as to ensure that the reagent and catalyst will become fully dissolved/dispersed. Alternatively, the sample holder can contain the reagent and/or the catalyst in immobilised form so as to facilitate the isolation of the product of the chemical reactions.

The apparatus makes it possible to perform a number of other valuable methods for performing chemical reactions. In one embodiment, the progress of the reaction is simultaneously monitored by scanning the sample before (reference set of reflection factors) and after application of the electromagnetic radiation. By comparing a set of reflection factors after and before (reference set) heating, the progress can be determined. Comparison of microwave signals between a reference situation (empty applicator) and a situation where a sample is introduces in an applicator is described in U.S. Pat. No. 5,521,360. In respect of the present invention, it is possible vary the process parameters by means of the controller (45) in response to the measured sets of reflection factors. The sets of coupling efficiencies can preferably be normalised and/or transposed before comparison.

Thus, the present invention provides a method for performing a chemical reaction according to the third aspect of the present invention described earlier.

In one intriguing variant (the "biosensor" variant) of the above method, the first (reference) varying of the frequency (step (b)) (a "scan") is performed prior to introduction of chemical substance to the sample. The sample can comprise an enzyme or a biomolecule or a cell, for which the chemical substance is a substrate or a ligand. The subsequent "scan" is then performed and the difference in reflection factor is expected to reflect the interaction between the chemical substance and the components of the sample. This embodiment can be an especially interesting variant for studying the interaction between a ligand/substrate and an enzyme. The heating (step (c)) is often omitted in this variant. Furthermore, repeating the steps will only be necessary in order to study the mentioned interaction over time, otherwise only comparison of two sets of reflection factors will be necessary.

Furthermore, the present invention also provides a method for identifying minimum reflection (or two or more minima) for application of electromagnetic radiation (especially where the predetermined range comprises the frequency that provides optimal coupling between the electromagnetic radiation and the sample). I.e. the present invention provides a method of performing a chemical reaction according to the fifth aspect of the present invention described earlier.

The invention also provides a method for seeking for a frequency representing a local (or global) reflection factor while performing a chemical reaction, i.e. a method of performing a chemical reaction according to the sixth aspect of the present invention described earlier.

The invention furthermore provides a method for seeking for a frequency where the reflection factor has a predetermined level while performing a chemical reaction, i.e. a method of performing a chemical reaction according to the seventh aspect of the present invention described earlier.

In an especially interesting variant of the methods described herein, each sample comprises at least one enzyme and, further, each sample is a PCR mixture.

The PCR reaction is a particularly interesting application for the apparatus according to the sixth aspect of the present invention as the apparatus provides means for varying and pulsing the energy applied (and thereby the temperature of a PCR vial) accurately. Furthermore, the apparatus comprises means for controlling and monitoring the progress of the PCR reaction.

The PCR technique is generally described in U.S. Pat. No. 4,683,202 and U.S. Pat. No. 4,683,196. The use of microwave radiation for heating PCR mixtures is known, i.e. from WO 91/12888, WO 95/15671 and WO 98/06876, however processing by using the apparatus according to the present invention provides unprecedented advantages over the known systems. General guidelines for handling and processing PCR mixtures (e.g. temperature ranges and cycle numbers and times) can be found in WO 98/06876. A typical example of a temperature cycle for a PCR is a denaturation heating step up to around 80-100 degree. C. (e.g. 0.5-3 minutes), a cooling step where the mixture is brought to around 20-40.degree. C. (e.g. 0.1 to 1 minute) and a polymerisation step at around 55-75.degree. C. (e.g. for 1-5 minutes). A complete amplification reaction typically involves 15-100 cycles, e.g. around 25-35 cycles.

With the present invention it is possible to control the application of energy very accurately and to apply the energy in controllable doses and to cool the samples very rapidly so as to reduce the cooling steps. Furthermore, it is also possible to monitor the progress of the reactions by applying a low intensity microwave signal to the reaction mixture, e.g., in each cooling step so as to determine the completion (relative to certain criteria) of the reactions. Thus, the electromagnetic radiation is preferably applied in cycles of at least two levels where the samples are cooled at least during a part of each cycle. The at least two levels can represent the temperature levels of 80-100.degree. C. and 55-75.degree. C. Typically, the cooling is initiated in order to reach a temperature level of 20-40.degree. C. The cooling can also be applied constantly (e.g. in the form of a cold block (bottom plate) in order to obtain a steeper cooling gradient.

1. A method of performing a chemical reaction, said method comprising: a) providing a sample in an applicator, b) applying electromagnetic radiation to the sample in form of a first shaped pulse and characterising a reflected pulse from the applicator by performing a mathematical operation so as to obtain a first reflected spectrum, c) changing at least one of a physical and chemical property of the sample, d) applying electromagnetic radiation to the sample in form of a second shaped pulse and characterising a reflected pulse from the applicator by performing a mathematical operation so as to obtain a second reflected spectrum, e) repeating step c) and d) until a difference between the first and second reflected spectra calculated as the mathematical difference between the first and second spectra is within a given range.

2. A method according to claim 1, wherein the mathematical operation for obtaining the first and second reflection spectra includes a Fourier Transformation.

3. A method according to claim 1, wherein the reaction is conducted in an apparatus including at least one generator for generating waves of electromagnetic radiation, each of said at least one generators being capable of generating electromagnetic radiation at at least one frequency, at least one guide for guiding at least part of a generated wave of electromagnetic radiation to at least one applicator, and a controller for individually controlling each of said at least one generators in response to a control signal, the control signal reflecting the status of a sample in the at least one applicator.

4. A method of performing a plurality of chemical reactions simultaneously, said method comprising: a) providing a first sample into a first applicator, b) providing a second sample into a second applicator, c) applying electromagnetic radiation to the first sample in the first applicator from a first generator, the first generator being capable of generating electromagnetic radiation at a plurality of frequencies, d) applying electromagnetic radiation to the second sample in the second applicator from a second generator, the second generator being capable of generating electromagnetic radiation at a plurality of frequencies, and e) individually controlling the electromagnetic radiation applied to the first and second applicator by individually and independently controlling the first and second generator in response to control signals from the first and second applicators.

5. A method according to claim 4, wherein the applied electromagnetic radiation is within the range of 300 MHz-300 GHz.

6. A method according to claim 4, wherein the electromagnetic radiation applied to the first and second sample has essentially the same frequency and essentially the same power level so as to expose the first and second sample to essentially the same conditions.

7. A method according to claim 4, wherein the first and second samples are PCR mixtures.

8. A method according to claim 4, wherein the electromagnetic radiation is applied to the samples in cycles of at least two steps where the samples are cooled at least during a part of each cycle.

9. A method according to claim 4, wherein the reaction is conducted in an apparatus including at least one generator for generating waves of electromagnetic radiation, each of said at least one generators being capable of generating electromagnetic radiation at at least one frequency, at least one guide for guiding at least part of a generated wave of electromagnetic radiation to at least one applicator, and a controller for individually controlling each of said at least one generators in response to a control signal, the control signal reflecting the status of a sample in the at least one applicator.

10. A method for performing a plurality of chemical reactions simultaneously or sequentially, said method comprising: a) providing a first sample into a first applicator, b) providing a second sample into a second applicator, and c) applying electromagnetic radiation to the first and second samples simultaneously or sequentially for a period of time, the electromagnetic radiation having a frequency in the range of 300 MHz-300 GHz.

11. A method according to claim 10, wherein the electromagnetic radiation is provided specifically and independently to each of the samples.

12. A method according to claim 10, wherein the applied electromagnetic radiation includes one or more pulses.

13. A method according to claim 10, wherein each sample is a PCR mixture.

14. A method according to claim 10, wherein the electromagnetic radiation is applied in cycles of at least two steps where the samples are cooled at least during a part of each cycle.

15. A method according to claim 10, wherein the electromagnetic radiation is provided by an apparatus for providing electromagnetic radiation including: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

16. A method for performing a chemical reaction, said method comprising: a) providing a sample in an applicator, b) applying electromagnetic radiation to the sample for a first period of time at a first level of power and varying the frequency of the electromagnetic radiation between two values and with a given resolution, and determining a reflection factor of electromagnetic radiation from the sample at at least two of the frequencies covered by the range of the two values by determining the level of a feedback signal, thereby obtaining a first set of reflection factors, c) changing at least one of the physical and chemical properties of the sample, d) applying electromagnetic radiation to the applicator at a second level of power and varying the frequency of the electromagnetic radiation between two values and with a given resolution, the range defined by the values being included in the range defined by the values in step b), and determining a reflection factor of electromagnetic radiation from the sample at at least two of the frequencies covered by the range of the two values by determining the level of the feed-back signal, thereby obtaining a second set of reflection factors, and e) repeating step c) and d) until the difference in reflection factors calculated as the mathematical difference between the frequencies associated with the first and second set of reflection factors is within a given range.

17. A method for performing a chemical reaction, said method comprising: a) providing a sample in an applicator, b) applying electromagnetic radiation to the sample, the electromagnetic radiation having a starting frequency, c) varying the frequency of the applied electromagnetic radiation between two values and with a given resolution, d) determining a reflection factor of electromagnetic radiation from the sample by determining a level of a feed-back signal during at least part of the varying of the frequency of the electromagnetic radiation, and e) determining, from the level of the feed-back signal, the frequency of the electromagnetic radiation wherein the reflection factor is within a given range.

18. A method for performing a chemical reaction, said method comprising: a) providing a sample in an applicator, b) applying electromagnetic radiation to the sample, the electromagnetic radiation having a starting frequency, c) varying the frequency of the electromagnetic radiation incrementally around the starting frequency, d) determining a reflection factor of electromagnetic radiation from the sample by determining a level of a feed-back signal at the starting frequency, at frequency incrementally lower than the starting frequency and at a frequency incrementally higher than the starting frequency, e) repeating step b) and d) until the reflection factor is at a minimum.

19. A method for performing a chemical reaction, said method comprising: a) providing a sample in an applicator, b) applying electromagnetic radiation to the sample, the electromagnetic radiation having a starting frequency, c) varying the frequency of the electromagnetic radiation incrementally around the starting frequency, d) determining a reflection factor of electromagnetic radiation from the sample by determining a level of a feed-back signal at the starting frequency, at a frequency incrementally lower than the starting frequency and a frequency incremental higher than the starting frequency, e) comparing the determined reflection factor with a reflection factor, f) adjusting the starting frequency to a frequency so that the determined reflection factor is within a range around the reflection factor, and g) repeating step c) to f) as often as desirable.

20. A method according to claim 16, wherein the starting frequency is in the range of 300 MHz-300 GHz.

21. A method according to claim 17, wherein the starting frequency is in the range of 300 MHz-300 GHz.

22. A method according to claim 18, wherein the starting frequency is in the range of 300 MHz-300 GHz.

23. A method according to claim 19, wherein the starting frequency is in the range of 300 MHz-300 GHz.

24. A method according to claim 16, wherein the values between which the frequency of the electromagnetic field is varied are in the range of 300 MHz-300 GHz, such as within the range 0,5-3 GHz or within the range 50-100 GHz.

25. A method according to claim 17, wherein the values between which the frequency of the electromagnetic field is varied are in the range of 300 MHz-300 GHz, such as within the range 0,5-3 GHz or within the range 50-100 GHz.

26. A method according to claim 18, wherein the values between which the frequency of the electromagnetic field is varied are in the range of 300 MHz-300 GHz, such as within the range 0.5-3 GHz or within the range 50-100 GHz.

27. A method according to claim 19, wherein the values between which the frequency of the electromagnetic field is varied are in the range of 300 MHz-300 GHz, such as within the range 0.5-3 GHz or within the range 50-100 GHz.

28. A method according to claim 20, wherein the values between which the frequency of the electromagnetic field is varied are in the range of 300 MHz-300 GHz, such as within the range 0,5-3 GHz or within the range 50-100 GHz.

29. A method according to claim 16, wherein the reaction is conducted in an apparatus according to an apparatus for providing electromagnetic radiation comprising: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

30. A method according to claim 17, wherein the reaction is conducted in an apparatus according to an apparatus for providing electromagnetic radiation comprising: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

31. A method according to claim 18, wherein the reaction is conducted in an apparatus for providing electromagnetic radiation comprising: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

32. A method according to claim 19, wherein the reaction is conducted in an apparatus for providing electromagnetic radiation comprising: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

33. A method according to claim 20, wherein the reaction is conducted in an apparatus for providing electromagnetic radiation comprising: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

34. A method according to claim 24, wherein the reaction is conducted in an apparatus for providing electromagnetic radiation comprising: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

35. A method for performing a chemical reaction, said method comprising: a) providing a sample in an applicator, b) applying electromagnetic radiation to the sample in form of a first pulse with a shape and characterising a reflected pulse from the applicator by performing a mathematical operation so as to obtain a first reflected spectrum, c) changing at least one of the physical and chemical properties of the sample, d) applying electromagnetic radiation to the sample in form of a second pulse with a shape and characterising a reflected pulse from the applicator by performing a mathematical operation so as to obtain a second reflected spectrum, e) repeating step c) and d) until the difference between the first and second reflected spectra calculated as the mathematical difference between the first and second spectra is within a given range.

36. A method according to claim 35, wherein the mathematical operation for obtaining the first and second reflection spectra includes a Fourier Transformation.

37. A method according to claim 35, wherein the reaction is conducted in an apparatus for providing electromagnetic radiation comprising: a) at least one generator for generating waves of electromagnetic radiation, each of said at lest one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

38. The use of an apparatus for performing the method according to claim 10 for temperature cycling a PCR mixture.

39. The use according to claim 38 for performing a chemical reaction in a sample, wherein the frequency of the electromagnetic radiation applied to the sample in the applicator, the level of irradiated power and the period of applying the electromagnetic radiation is determined by values for the chemical reaction in question, such values being stored in a storage means associated with the control means.

40. The use according to claim 38, wherein corresponding data of frequency and reflection factor are stored in a memory for further processing.

41. The use according to claim 40, wherein further processing is performed in a neural network.

42. A kit for chemically reacting chemical species with a reagent optionally under the action of a catalyst, wherein the chemical reaction is performed in the apparatus according to claim 38, said kit comprising: a) a sample holder comprising at least one of the reagent and the optional catalyst, b) an electronic storage means including data concerning the chemical reaction between the chemical species and the reagent under the optional action of the catalyst, said electronic storage means and apparatus being adapted for retrieving the data from the storage means and processing said data so as to control the application of an electromagnetic radiation to said sample holder.

43. A kit for chemically reacting chemical species with a reagent according to claim 42, said kit further comprising instructions regarding addition of the chemical species to the sample holder.

The invention claimed is:

1. A method for performing a chemical reaction, said method comprising:
    a) providing a sample in an applicator,
    b) applying electromagnetic radiation to the sample for a first period of time at a first level of power and varying the frequency of the electromagnetic radiation between two values and with a given resolution, and determining a reflection factor of electromagnetic radiation from the sample at least two of the frequencies covered by the range of the two values by determining the level of a feedback signal, thereby obtaining a first set of reflection factors,
    c) changing at least one of the physical and chemical properties of the sample,
    d) applying electromagnetic radiation to the applicator at a second level of power and varying the frequency of the electromagnetic radiation between two values and with a given resolution, the range defined by the values being included in the range defined by the values in step b), and determining a reflection factor of electromagnetic radiation from the sample at least two of the frequencies covered by the range of the two values by determining the level of the feed-back signal, thereby obtaining a second set of reflection factors, and
    e) repeating step c) and d) until the difference in reflection factors calculated as the mathematical difference between the frequencies associated with the first and second set of reflection factors is within a given range.

2. A method according to claim 1, wherein the starting frequency is in the range of 300 MHz-300 GHz.

3. A method according to claim 2, wherein the values between which the frequency of the electromagnetic field is varied are in the range of 300 MHz-300 GHz.

4. A method according to claim 2, wherein the reaction is conducted in an apparatus for providing electromagnetic radiation comprising: a) at least one generator for generating waves of electromagnetic radiation, each of said at least one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

5. A method according to claim 1, wherein the values between which the frequency of the electromagnetic field is varied are in the range of 300 MHz-300 GHz.

6. A method according to claim 5, wherein the reaction is conducted in an apparatus for providing electromagnetic radiation comprising: a) at least one generator for generating waves of electromagnetic radiation, each of said at least one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

7. A method according to claim 1, wherein the reaction is conducted in an apparatus according to an apparatus for providing electromagnetic radiation comprising: a) at least one generator for generating waves of electromagnetic radiation, each of said at least one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

8. A method for performing a chemical reaction, said method comprising:
   a) providing a sample in an applicator,
   b) applying electromagnetic radiation to the sample, the electromagnetic radiation having a starting frequency,
   c) varying the frequency of the electromagnetic radiation incrementally around the starting frequency,
   d) determining a reflection factor of electromagnetic radiation from the sample by determining a level of a feedback signal at the starting frequency, at frequency incrementally lower than the starting frequency and at a frequency incrementally higher than the starting frequency,
   e) repeating step b) and d) until the reflection factor is at a minimum.

9. A method according to claim 8, wherein the starting frequency is in the range of 300 MHz-300 GHz.

10. A method according to claim 8, wherein the values between which the frequency of the electromagnetic field is varied are in the range of 300 MHz-300 GHz.

11. A method according to claim 8, wherein the reaction is conducted in an apparatus for providing electromagnetic radiation comprising: a) at least one generator for generating waves of electromagnetic radiation, each of said at least one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

12. A method for performing a chemical reaction, said method comprising:
   a) providing a sample in an applicator, the sample including two or more materials
   b) applying electromagnetic radiation to the sample, the electromagnetic radiation having a starting frequency,
   c) varying the frequency of the electromagnetic radiation incrementally around the starting frequency,
   d) determining a reflection factor of electromagnetic radiation from the sample by determining a level of a feedback signal at the starting frequency, at a frequency incrementally lower than the starting frequency and a frequency incremental higher than the starting frequency,
   e) comparing the determined reflection factor with a reflection factor,
   f) adjusting the starting frequency to a frequency so that the determined reflection factor is within a range around the reflection factor, said range indicating coupling between the electromagnetic radiation and the sample and
   g) repeating step c) to f) as often as desirable.

13. A method according to claim 12, wherein the starting frequency is in the range of 300 MHz-300 GHz.

14. A method according to claim 12, wherein the values between which the frequency of the electromagnetic field is varied are in the range of 300 MHz-300 GHz.

15. A method according to claim 12, wherein the reaction is conducted in an apparatus for providing electromagnetic radiation comprising: a) at least one generator for generating waves of electromagnetic radiation, each of said at least one generators being capable of generating electromagnetic radiation at least one frequency, b) at least one guide for guiding at least part of a generated wave of electromagnetic radiation to at least one applicator, and c) a controller for individually controlling each of said at least one generators in response to a control signal, the control signal reflecting the status of a sample in on at least one applicators.

* * * * *